(12) United States Patent
Ni et al.

(10) Patent No.: US 11,490,014 B2
(45) Date of Patent: Nov. 1, 2022

(54) LENS DRIVING DEVICE

(71) Applicant: Changzhou AAC Raytech Optronics Co., Ltd., Changzhou (CN)

(72) Inventors: Tianheng Ni, Shenzhen (CN); Rongfu Xie, Shenzhen (CN); Feng Yan, Shenzhen (CN); Gang Li, Shenzhen (CN); Suohe Wei, Shenzhen (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 0 days.

(21) Appl. No.: 17/522,826

(22) Filed: Nov. 9, 2021

(65) Prior Publication Data

US 2022/0150410 A1 May 12, 2022

(30) Foreign Application Priority Data

Nov. 11, 2020 (CN) .......................... 202022596175.7

(51) Int. Cl.
| | |
|---|---|
| *H04N 5/232* | (2006.01) |
| *G03B 5/00* | (2021.01) |
| *H04N 5/225* | (2006.01) |
| *G03B 17/12* | (2021.01) |

(52) U.S. Cl.
CPC ........... *H04N 5/23287* (2013.01); *G03B 5/00* (2013.01); *G03B 17/12* (2013.01); *H04N 5/2252* (2013.01); *G03B 2205/0053* (2013.01)

(58) Field of Classification Search
CPC ............. H04N 5/23287; H04N 5/2254; H04N 5/2252; H04N 5/2253; G03B 17/12; G03B 5/00; G03B 30/00; G03B 2205/0069; G03B 2205/0007; G03B 2205/0053
USPC ...................................... 348/208.11
See application file for complete search history.

(56) References Cited

U.S. PATENT DOCUMENTS

| | | | | |
|---|---|---|---|---|
| 8,817,116 | B2* | 8/2014 | Kim .................... | H04N 5/2328 348/208.7 |
| 9,625,735 | B2* | 4/2017 | Yasuda ............... | H04N 5/2254 |
| 10,802,376 | B2* | 10/2020 | Sugawara ............... | G02B 7/09 |
| 11,243,452 | B2* | 2/2022 | Minamisawa ........... | G03B 5/06 |
| 11,409,125 | B2* | 8/2022 | Minamisawa ........... | G03B 5/00 |
| 2013/0107068 | A1* | 5/2013 | Kim ....................... | G03B 3/10 348/208.11 |

(Continued)

*Primary Examiner* — Pritham D Prabhakher
(74) *Attorney, Agent, or Firm* — W&G Law Group

(57) ABSTRACT

A lens driving device includes first and second support frames, lens barrel, anti-shake magnets, anti-shake coils, flexible PCB, metal sheets, and support assembly including support member and first and second guiding posts. Support member includes support plate and first and second support walls. First soft protruding rubbers are respectively provided at positions of top surface of first support frame corresponding first support walls, and second soft protruding rubbers are respectively provided at positions of inner wall of second support frame corresponding to two sides of each second support wall. Compared with the prior art, lens driving device of the present disclosure makes impact limit position of first support walls closer to deflection axis position in first direction, and makes impact limit positions of second support walls closer to deflection axis position in second direction to reduce speed of limit impact, thereby reducing risk of generating particles due to impact.

9 Claims, 8 Drawing Sheets

(56) References Cited

U.S. PATENT DOCUMENTS

| | | | |
|---|---|---|---|
| 2014/0327790 A1* | 11/2014 | Kim | G03B 5/00 |
| | | | 359/557 |
| 2015/0195460 A1* | 7/2015 | Yasuda | H04N 5/23287 |
| | | | 359/557 |
| 2017/0351159 A1* | 12/2017 | Kudo | G02B 27/646 |
| 2018/0348538 A1* | 12/2018 | Sugawara | H04N 5/2254 |
| 2019/0170967 A1* | 6/2019 | Jung | G02B 26/085 |
| 2019/0294026 A1* | 9/2019 | Sugawara | G02B 27/646 |
| 2019/0294028 A1* | 9/2019 | Minamisawa | H04N 5/2254 |
| 2020/0341289 A1* | 10/2020 | Minamisawa | G02B 7/08 |
| 2021/0048730 A1* | 2/2021 | Jeong | G02B 27/646 |

* cited by examiner

LENS DRIVING DEVICE

TECHNICAL FIELD

The present disclosure relates to the technical field of photographing apparatus, and in particular, to a lens driving device.

BACKGROUND

Lens driving devices are devices that are configured to drive lenses of apparatus with shooting functions to be automatically adjusted. The apparatus can be digital cameras, digital video cameras, smart phones, tablet computers, etc. The lens driving device can realize optical image stabilization under automatic adjustment.

The lens driving device in the related art includes a first support frame with a receiving space, a second support frame sleeved on the first support frame, a lens barrel accommodated in the receiving space, a support member for supporting the first support frame to deflect the first support frame along two diagonal directions, anti-shake magnets for providing magnetic forces, anti-shake coils for cooperating with the anti-shake magnets to drive the first support frame to deflect, a flexible printed circuit board for controlling the anti-shake coils, and metal sheets for providing restoring forces. When the lens is driven, a current is applied to the anti-shake coils so that the anti-shake coils cooperate with the corresponding anti-shake magnets to drive the first support frame to deflect along the diagonal directions, thereby driving the lens to deflect.

Although the support member can support the first support frame to be deflected, the support member is required to cooperate with the side walls of the first support frame and the second support frame to perform impact limit therebetween when the support member is deflected, so as to prevent its deflection angle from being too large. Moreover, there may be a risk of generating particles since the support member cooperates with the side walls of the first support frame and the second support frame to limit the impact therebetween. Therefore, it is necessary to provide a lens driving device to solve this problem.

SUMMARY

The technical problem to be solved by the present disclosure is to provide a lens driving device that reduces the risk of generating particles due to impact.

The present disclosure provides a lens driving device. The lens driving device includes: a first support frame having a rectangular structure with a receiving space; a second support frame having a rectangular structure, the second support frame being sleeved on the first support frame and spaced apart from the first support frame; a lens barrel received in the receiving space and configured to install a lens; a support assembly including a support member, two first guiding posts, and two second guiding posts; at least two anti-shake magnets fixed to adjacent sidewalls of the first support frame, respectively; at least two anti-shake coils fixed to adjacent sidewalls of the second support frame, respectively; a flexible printed circuit board fixed to an outer peripheral side of the second support frame and electrically connected to the at least two anti-shake coils; and at least two metal sheets, each of the at least two metal sheets being opposite to and spaced apart from one of the at least two anti-shake magnets, and one of the at least two metal sheets and one of the at least two anti-shake magnets magnetically attracting each other. The support member includes a support plate having a rectangular ring shape, first support walls respectively bent and extending from one pair of diagonal positions of the support plate, and second support walls respectively bent and extending from another pair of diagonal positions of the support plate, and each of the first support walls and the second support walls is spaced apart from the first support frame. The two first guiding posts are spaced apart from each other and are disposed at one pair of diagonal positions of the first support frame, respectively; and the two second guiding posts are spaced apart from each other and are disposed at another pair of diagonal positions of the first support frame, respectively. The support plate is located on top of the lens barrel and spaced apart from the lens barrel, the first support walls are rotatably connected to the first support frame through the two first guiding posts, respectively; and the second support walls are rotatably connected to the second support frame through the two second guiding posts, respectively, and are spaced apart from the first support frame. First soft protruding rubbers are respectively provided at positions of a top surface of the first support frame corresponding to the first support walls, and second soft protruding rubbers are respectively provided at positions of an inner wall of the second support frame corresponding to two sides of each of the second support walls. Each of the at least two anti-shake coils is opposite to and spaced apart from one anti-shake magnet of the at least two anti-shake magnets, and a force generated by each anti-shake coil and a corresponding anti-shake magnet jointly drives the first support frame to deflect in a first direction or a second direction. The first direction and the second direction are both perpendicular to an optical axis direction, and parallel to two diagonal lines of the first support frame, respectively.

As an improvement, a width of each of the first soft protruding rubbers along the second direction is equal to a width of each of the first support walls along the second direction.

As an improvement, the first soft protruding rubbers are located at edges of the top surface of the first support frame, respectively.

As an improvement, the second support frame is provided with fixing grooves, each of which is located at a position corresponding to one of the second soft protruding rubbers; and the second soft protruding rubbers are fixed in the fixing grooves, respectively.

As an improvement, each of portions of the first support frame corresponding to the first support walls has a first planar structure.

As an improvement, each of portions of the second support frame corresponding to the second support walls has a second planar structure.

As an improvement, the lens driving device further includes a base and a shell covering the base, and the at least two metal sheets are fixed in the shell.

Compared with the prior art, in the lens driving device of the present disclosure, the first soft protruding rubbers are respectively provided at the positions of the top surface of the first support frame corresponding the first support walls, and the second soft protruding rubbers are respectively provided at the positions of an inner wall of the second support frame corresponding to the two sides of each of the second support walls. In this way, the impact limit positions of the first support walls are closer to the deflection axis position in the first direction deflection, and the impact limit positions of the second support walls are closer to the deflection axis position in the second direction, in order to reduce the speed of the limit impact, thereby reducing the risk of generating particles due to the impact.

BRIEF DESCRIPTION OF DRAWINGS

In order to more clearly describe the technical solutions in the embodiments of the present disclosure or the prior art, the following will briefly describe the drawings used in the description of the embodiments of the present disclosure or the prior art. It is apparent that the drawings in the following description merely illustrate some embodiments of the present disclosure. Those skilled in the art can obtain other drawings based on these drawings.

Figure 1:
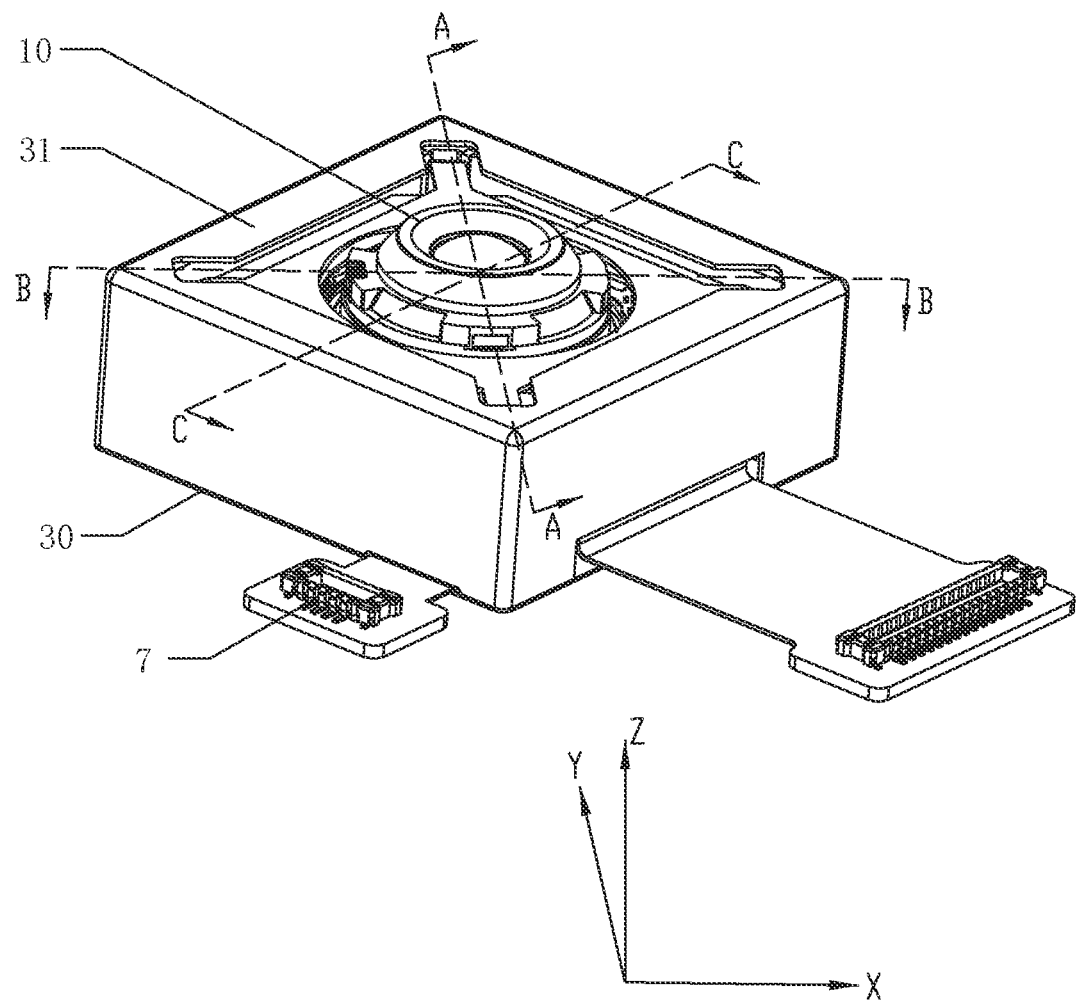
FIG. 1 is a schematic respective view showing a structure of a lens driving device according to an embodiment of the present disclosure.

DESCRIPTION OF REFERENCE NUMERALS 1. first support frame; 11. first soft protruding rubber;
2. second support frame; 21. second soft protruding rubber; 22. fixing groove;
3. lens barrel;
4. support assembly; 41. support member; 411. support plate; 412. first support wall; 413. second support wall; 42. first guiding post; 43. second guiding post;
5. anti-shake magnet;
6. anti-shake coil;
7. flexible printed circuit board;
8. metal sheet;
9. Hall sensor;
10. lens; 30. base; 31. shell.

DESCRIPTION OF EMBODIMENTS

In order to clearly understand the purpose, technical solutions and advantages of the present disclosure, the following further describes the present disclosure in detail with reference to the drawings and embodiments. It should be understood that the specific embodiments described herein merely intend to explain the present disclosure, but cannot be construed as limitations on the present disclosure.

An embodiment of the present disclosure provides a lens driving device. As shown in FIG. 1 to FIG. 8, the lens driving device includes a first support frame 1, a second support frame 2, a lens barrel 3, a support assembly 4, at least two anti-shake magnets 5, at least two anti-shake coils 6, a flexible printed circuit board 7, at least two metal sheets 8, and Hall sensors 9.

Figure 2:
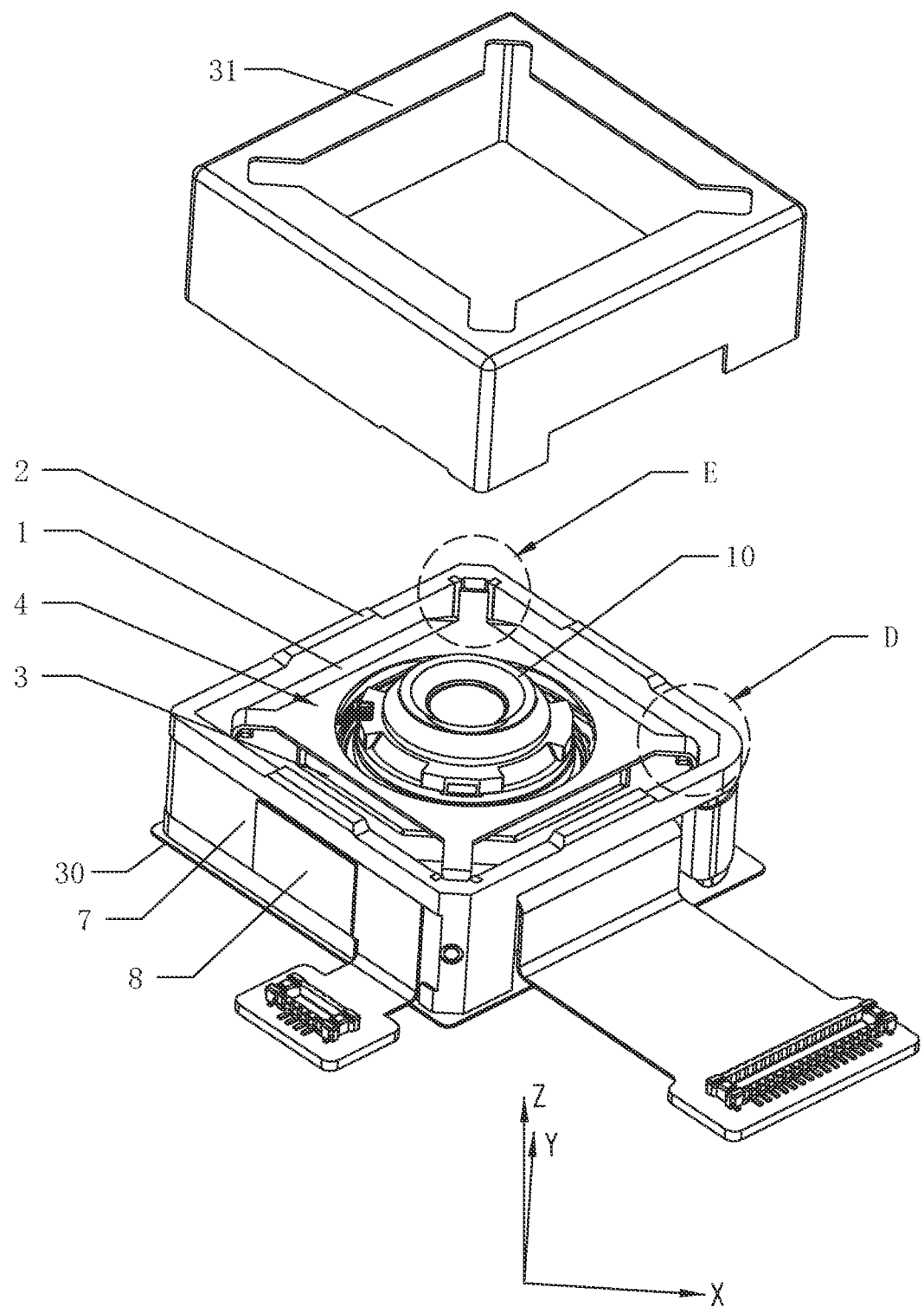
FIG. 2 is a schematic exploded view showing a partial structure of a lens driving device according to an embodiment of the present disclosure.

In an embodiment, as shown in FIG. 1 and FIG. 2, the lens driving device 10 further includes a base 30 and a shell 31 covering the base 30, the second support frame 2 is disposed on the base 30, and the first support frame 1 and the second support frame 2 are both located in the shell 31.

Figure 5:
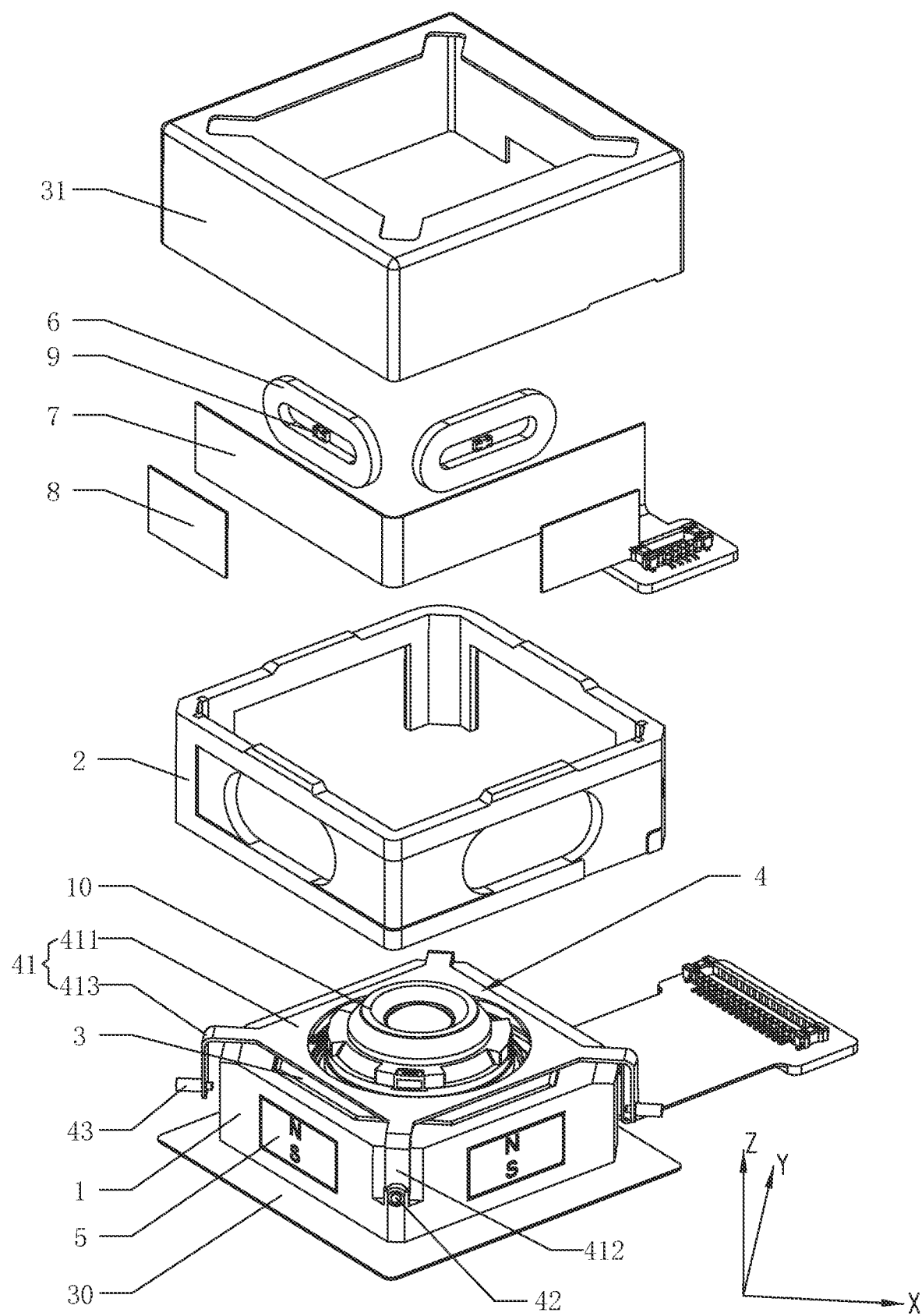
FIG. 5 is a schematic exploded view of a partial structure of a lens driving device according to another embodiment of the present disclosure.

In an embodiment, as shown in FIG. 5, the first support frame 1 has a rectangular structure with a receiving space.

In an embodiment, as shown in FIG. 2 or FIG. 5, the second support frame 2 has a rectangular structure, and is sleeved on the first support frame 1 and spaced apart from the first support frame 1.

In an embodiment, the lens barrel 3 is accommodated in the receiving space and is spaced apart from the second support frame 2 to mount the lens 10.

In the following description, as shown in FIG. 1, FIG. 2, and FIG. 5, an optical axis direction (an optical axis direction of the lens barrel 3) is the Z direction, a first direction (perpendicular to the optical axis direction) is the X direction, and a second direction (perpendicular to the optical axis direction) is the Y direction. The first direction and the second direction are two diagonal directions parallel to the first support frame 1, respectively.

In an embodiment, as shown in FIG. 5, the support assembly 4 includes a support member 41, two first guiding posts 42, and two second guiding posts 43.

In an embodiment, as shown in FIG. 5, the support member 41 includes a support plate 411 in a rectangular ring shape, first support walls 412, and second support walls 413. The first support walls 412 are respectively bent and extend from one pair of diagonal positions of the support plate, and are spaced apart from the first support frame 1. The second support walls 413 are respectively bent and extend from another pair of diagonal positions of the support plate, and are spaced apart from the first support frame 1.

Figure 6:
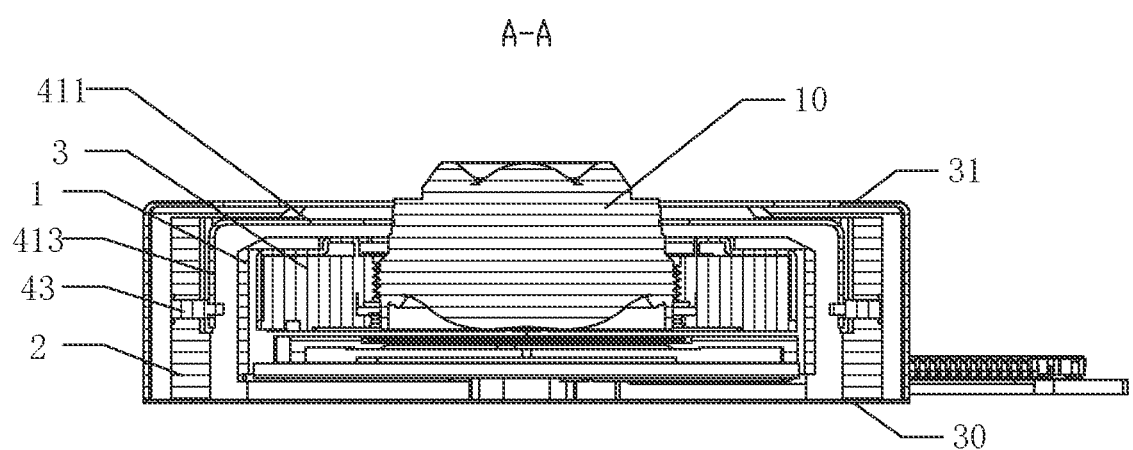
FIG. 6 is a cross-sectional view along line A-A in FIG. 1.
Figure 7:
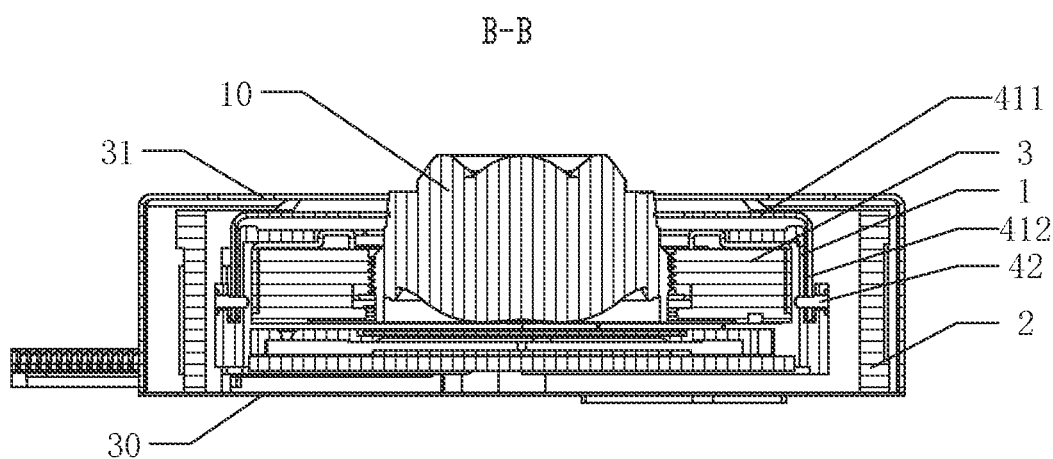
FIG. 7 is a cross-sectional view along line B-B in FIG. 1.

In an embodiment, as shown in FIG. 5, FIG. 6, and FIG. 7, the two first guiding posts 42 are arranged at one pair of diagonal positions of the first support frame 1, respectively, and are spaced apart from each other; and the two second guiding posts 43 are arranged at another pair of diagonal positions of the first support frame 1, respectively, and are spaced apart from each other.

In an embodiment, as shown in FIG. 5 and FIG. 7, the support plate 411 is located on top of the lens barrel 3 and spaced apart from the lens barrel 3. The first support walls 412 is rotatably connected to the first support frame 1 through the first guiding posts 42. That is, the two first support walls 412 located at the one pair of diagonal positions of the support plate 411 are rotatably connected to the one pair of diagonal positions of the first support frame 1 through the two first guiding posts 42, respectively.

In an embodiment, as shown in FIG. 5 and FIG. 7, the second support walls 413 are rotatably connected to the second support frame 2 through the second guiding posts 43, and are spaced apart from the first support frame 1. That is, the two second support walls 413 located at the another pair of diagonal positions of the support plates 411 are rotatably connected to the another pair of diagonal positions of the second support frame 2 through the two second guiding posts 43, respectively. The another pair of diagonal lines of the second support frame 2 are parallel to the another pair of diagonal lines of the first support frame 1.

In an embodiment, as shown in FIG. 5, FIG. 6, and FIG. 7, the first support frame 1 is connected to the support plate 411 through the first support walls 412, and is then connected to the second support frame 2 through the second support walls 413. In this way, the first support frame 1 is suspended in the second support frame 2, and when the first support frame 1 is to be deflected, the first support frame 1 is supported by the first support walls 412 or the second support walls 413 to achieve deflection.

Figure 3:
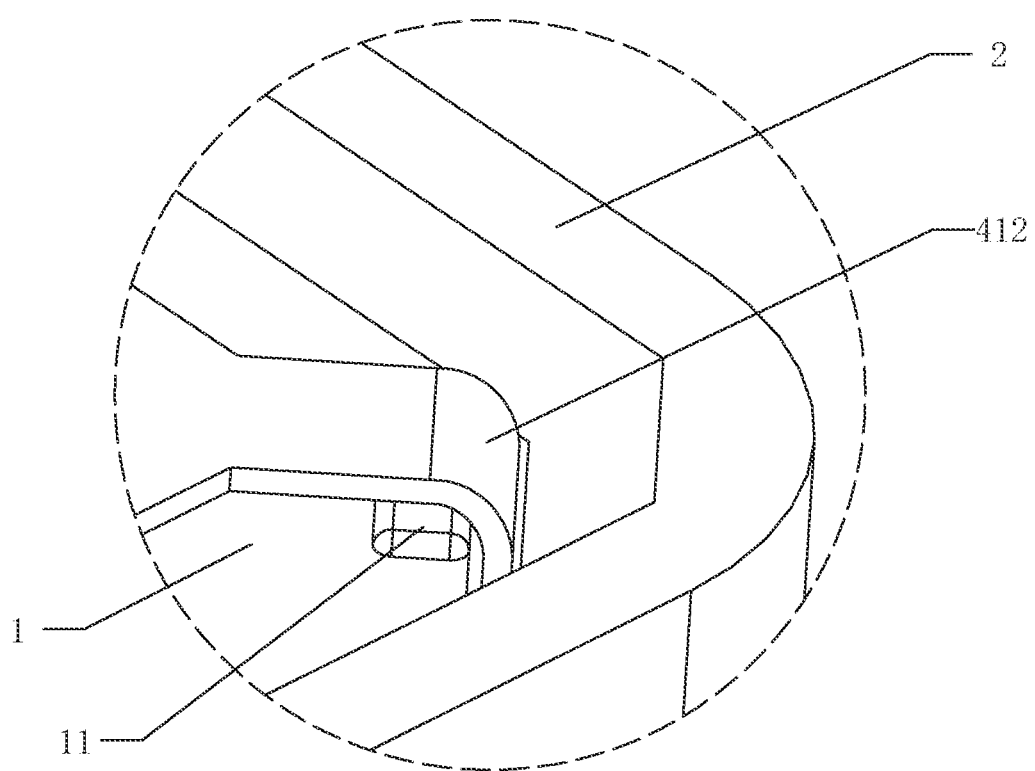
FIG. 3 is an enlarged structural view of a portion D in FIG. 2.

In an embodiment, as shown in FIG. 2, FIG. 3, and FIG. 5, each portion of the first support frame 1 corresponding to the first support wall 412 has a first planar structure. That is, each portion of the first support frame 1 corresponding to the first support wall 412 has a flat structure to facilitate the connection between the first support wall 412 and the first support frame 1 through the first guiding post 42.

Figure 4:
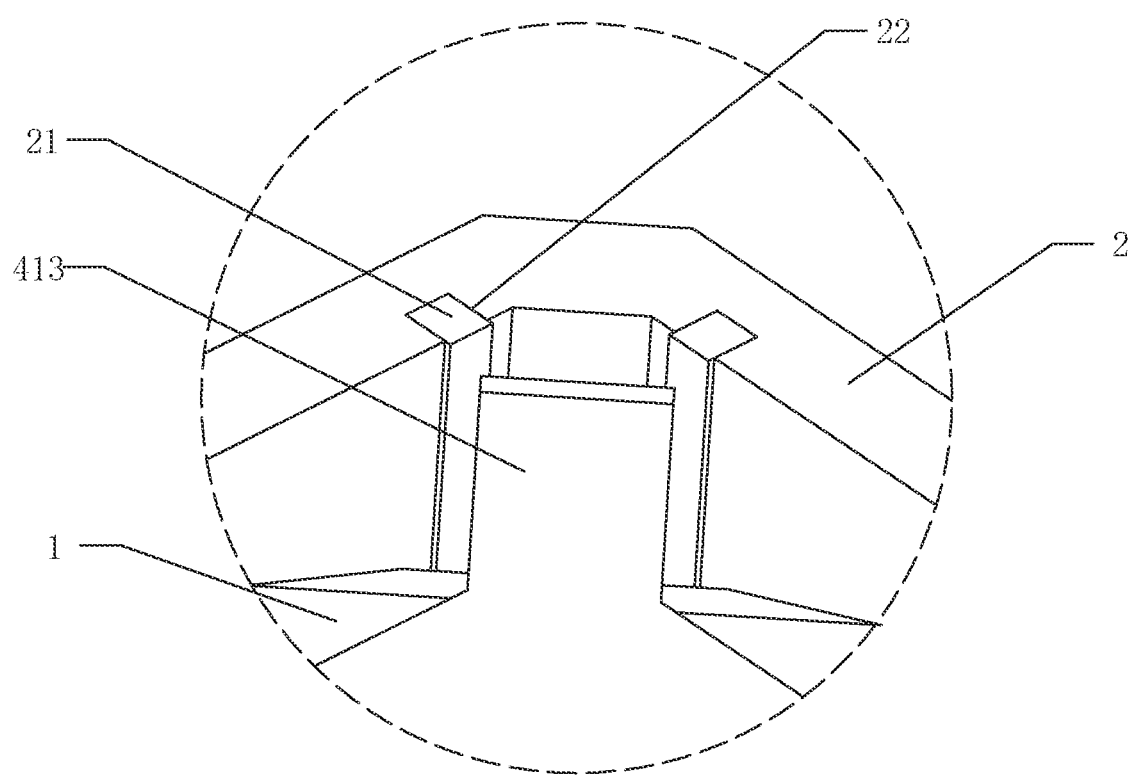
FIG. 4 is an enlarged structural view of a portion E in FIG. 2.

In an embodiment, as shown in FIG. 2, FIG. 4, and FIG. 5, each portion of the second support frame 2 corresponding to the second support wall 413 has a second planar structure. That is, each portion of the second support frame 2 corresponding to the second support wall 413 also has a flat structure to facilitate the connection between the second support wall 413 and the second support frame 2 through the second guiding post 43.

In an embodiment, as shown in FIG. 2 and FIG. 3, a first soft protruding rubber 11 is provided at a position of a top surface of the first support frame 1, which corresponds to the first support wall 412. The first soft protruding rubber 11 has a rectangular structure. It should be understood that the first soft protruding rubber 11 can has a triangular structure, a pentagonal structure, an elliptical structure, an irregular-shaped structure or the like based on actual requirements.

In an embodiment, as shown in FIG. 2 and FIG. 3, the first soft protruding rubber 11 is located at an edge of the top surface of the first support frame 1 to facilitate the arrangement of the first soft protruding rubber 11.

In an embodiment, as shown in FIG. 2 and FIG. 3, a width of the first soft protruding rubber 11 in the second direction is equal to a width of the first support wall 412 in the second direction. In this way, the impact limit position of the first support wall 412 is ensured to be close to the axis position of the deflection in the first direction, and the number of the soft rubbers can be reduced, thereby reducing the cost.

In an embodiment, as shown in FIG. 2 and FIG. 4, second soft protruding rubbers 21 are provided at positions of an inner wall of the second support frame 2 corresponding to both sides of each second support wall 413.

In an embodiment, as shown in FIG. 2 and FIG. 4, the second support frame 2 is provided with fixing grooves 22 at its positions corresponding to the second soft protruding rubbers 21, and the second soft protruding rubber 21 is fixed to the fixing groove 22. In this way, the stability of the second soft protruding rubber 21 is strengthened, thereby preventing the second soft protruding rubber from falling off due to impact.

In an embodiment, as shown in FIG. 5, at least two anti-shake magnets 5 are respectively fixed to adjacent sidewalls of the first support frame 1.

In an embodiment, as shown in FIG. 5, there are two anti-shake magnets 5. It should be understood that the number of anti-shake magnets 5 can be three, four, etc., based on actual requirements. In an embodiment, the anti-shake magnets 5 are sequentially fixed to the adjacent sidewalls of the first support frame 1.

Figure 8:
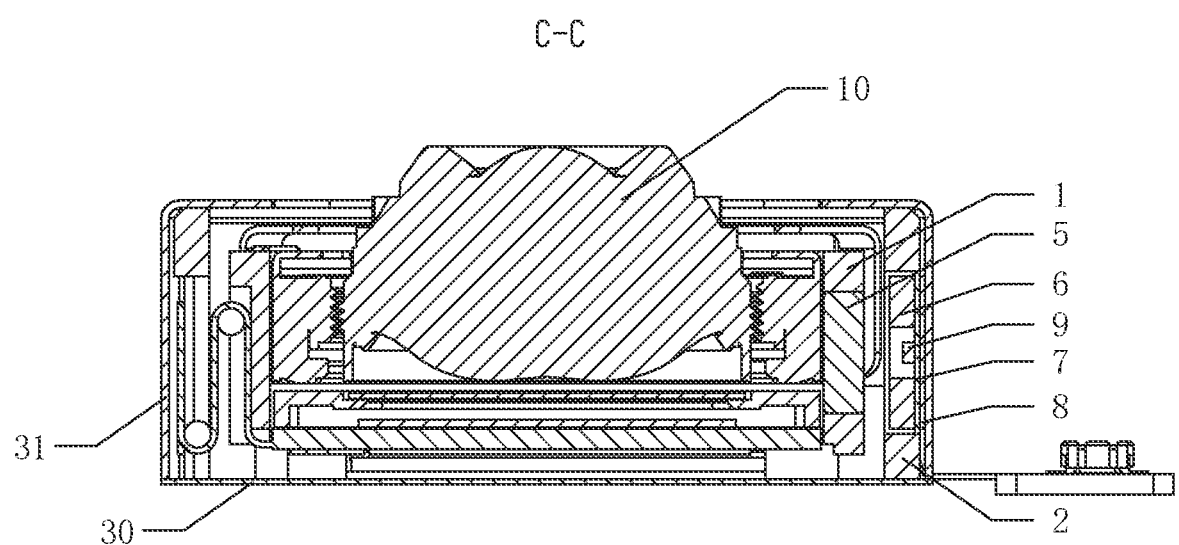
FIG. 8 is a cross-sectional view along line C-C in FIG. 1.

In an embodiment, as shown in FIG. 5 and FIG. 8, the at least two anti-shake coils 6 are respectively fixed to adjacent sidewalls of the second support frame 2, and each anti-shake coil 6 is opposite to and spaced apart from one of the at least two anti-shake magnets 5. A force generated by each anti-shake coil 6 and a corresponding anti-shake magnet 5 jointly drives the first support frame 1 to deflect in the first direction or the second direction.

In an embodiment, as shown in FIG. 5, there are two anti-shake coils 6. It should be understood that the number of anti-shake coils 6 can be three, four, etc., based on actual requirements. In an embodiment, the anti-shake coils 6 are sequentially fixed to the adjacent sidewalls of the second support frame 2.

In an embodiment, as shown in FIG. 2 and FIG. 5, the flexible printed circuit board 7 is fixed on an outer peripheral side of the second support frame 2 and is electrically connected to the anti-shake coils 6 to provide an electric signal to the anti-shake coils 6.

In an embodiment, as shown in FIG. 2 and FIG. 5, each of the at least two metal sheets 8 is opposite to and spaced apart from one of the at least two anti-shake magnets 5. The metal sheet 8 and the anti-shake magnet 5 corresponding to the metal sheet 8 magnetically attract each other to achieve an anti-shake restoring force.

In an embodiment, as shown in FIG. 5, there are two metal sheets 8. It should be understood that the number of metal sheets 8 may be three, four, etc., based on actual requirements.

In an embodiment, as shown in FIG. 8, the metal sheets 8 are fixed to the inner wall of the shell 31 to facilitate the fixing of the metal sheets 8, thereby improving the stability.

In an embodiment, as shown in FIG. 5 and FIG. 8, there are at least two Hall sensors 9 that are respectively fixed to the adjacent sidewalls of the second support frame 2. The Hall sensors 9 are electrically connected to the flexible printed circuit board 7 and are configured to respectively detect deflecting positions of the first support frame 1 in the first direction and the second direction.

In an embodiment, as shown in FIG. 5, there are two Hall sensors 9, each of which is located at a center of one of the two anti-shake coils 6.

Compared with the prior art, in the lens driving device of the present disclosure, the first soft protruding rubbers 11 are respectively provided at the positions of the top surface of the first support frame 1 corresponding the first support walls 412, and the second soft protruding rubbers 21 are respectively provided at the positions of an inner wall of the second support frame 2 corresponding to the two sides of each of the second support walls 413. Accordingly, the impact limit positions of the first support walls 412 are closer to the deflection axis position in the first direction, and the impact limit positions of the second support walls 413 are closer to the deflection axis positions in the second direction, in order to reduce the speed of the limit impact, thereby reducing the risk of generating particles due to the impact.

The above description is merely some embodiments of the present disclosure, and is not intended to limit the present disclosure. Any modification, equivalent replacement and improvement made within the spirit and principle of the present disclosure shall be included within the scope of the present disclosure.

What is claimed is:

1. A lens driving device, comprising:
   a first support frame having a rectangular structure with a receiving space;
   a second support frame having a rectangular structure, the second support frame being sleeved on the first support frame and spaced apart from the first support frame;
   a lens barrel received in the receiving space and configured to install a lens;
   a support assembly comprising a support member, two first guiding posts, and two second guiding posts;
   at least two anti-shake magnets fixed to adjacent sidewalls of the first support frame, respectively;
   at least two anti-shake coils fixed to adjacent sidewalls of the second support frame, respectively;

a flexible printed circuit board fixed to an outer peripheral side of the second support frame and electrically connected to the at least two anti-shake coils; and at least two metal sheets, each of the at least two metal sheets being opposite to and spaced apart from one of the at least two anti-shake magnets, and one of the at least two metal sheets and one of the at least two anti-shake magnets magnetically attracting each other, wherein the support member comprises a support plate having a rectangular ring shape, first support walls respectively bent and extending from one pair of diagonal positions of the support plate, and second support walls respectively bent and extending from another pair of diagonal positions of the support plate, and each of the first support walls and the second support walls is spaced apart from the first support frame;

wherein the two first guiding posts are spaced apart from each other and are disposed at one pair of diagonal positions of the first support frame, respectively; and the two second guiding posts are spaced apart from each other and are disposed at another pair of diagonal positions of the first support frame, respectively;

wherein the support plate is located on top of the lens barrel and spaced apart from the lens barrel, the first support walls are rotatably connected to the first support frame through the two first guiding posts, respectively; and the second support walls are rotatably connected to the second support frame through the two second guiding posts, respectively, and are spaced apart from the first support frame;

wherein first soft protruding rubbers are respectively provided at positions of a top surface of the first support frame corresponding to the first support walls, and second soft protruding rubbers are respectively provided at positions of an inner wall of the second support frame corresponding to two sides of each of the second support walls;

wherein each of the at least two anti-shake coils is opposite to and spaced apart from one anti-shake magnet of the at least two anti-shake magnets, and a force generated by each anti-shake coil and a corresponding anti-shake magnet jointly drives the first support frame to deflect in a first direction or a second direction; and wherein the first direction and the second direction are both perpendicular to an optical axis direction, and parallel to two diagonal lines of the first support frame, respectively.

2. The lens driving device as described in claim 1, wherein a width of each of the first soft protruding rubbers along the second direction is equal to a width of each of the first support walls along the second direction.

3. The lens driving device as described in claim 2, wherein the first soft protruding rubbers are located at edges of the top surface of the first support frame, respectively.

4. The lens driving device as described in claim 1, wherein the first soft protruding rubbers are located at edges of the top surface of the first support frame, respectively.

5. The lens driving device as described in claim 1, wherein the second support frame is provided with fixing grooves, each of which is located at a position corresponding to one of the second soft protruding rubbers; and the second soft protruding rubbers are fixed in the fixing grooves, respectively.

6. The lens driving device as described in claim 5, wherein each of portions of the second support frame corresponding to the second support walls has a second planar structure.

7. The lens driving device as described in claim 1, wherein each of portions of the first support frame corresponding to the first support walls has a first planar structure.

8. The lens driving device as described in claim 1, wherein each of portions of the second support frame corresponding to the second support walls has a second planar structure.

9. The lens driving device as described in claim 1, further comprising:
a base; and
a shell covering the base, the at least two metal sheets being fixed in the shell.

* * * * *